(12) United States Patent
Hayashi

(10) Patent No.: US 10,688,830 B2
(45) Date of Patent: Jun. 23, 2020

(54) PNEUMATIC TIRE

(71) Applicant: BRIDGESTONE CORPORATION, Tokyo (JP)

(72) Inventor: Shintaro Hayashi, Hachiouji (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 188 days.

(21) Appl. No.: 15/546,766

(22) PCT Filed: Jan. 28, 2016

(86) PCT No.: PCT/JP2016/052459
§ 371 (c)(1),
(2) Date: Jul. 27, 2017

(87) PCT Pub. No.: WO2016/121858
PCT Pub. Date: Aug. 4, 2016

(65) Prior Publication Data
US 2018/0015787 A1    Jan. 18, 2018

(30) Foreign Application Priority Data

Jan. 30, 2015  (JP) ................................. 2015-016379

(51) Int. Cl.
*B60C 11/12* (2006.01)
*B60C 11/03* (2006.01)
(Continued)

(52) U.S. Cl.
CPC ....... *B60C 11/0311* (2013.01); *B60C 11/0304* (2013.01); *B60C 11/11* (2013.01);
(Continued)

(58) Field of Classification Search
CPC ......... B60C 11/0304; B60C 2011/0348; B60C 2011/0341; B60C 2011/129; B60C 11/0306
(Continued)

(56) References Cited

U.S. PATENT DOCUMENTS

2010/0186861 A1*  7/2010  Ishiguro .............. B60C 11/0306
                                                        152/209.25
2010/0252157 A1   10/2010  Ito
(Continued)

FOREIGN PATENT DOCUMENTS

CN     104108289 A    10/2014
EP     2 151 333 A1    2/2010
(Continued)

OTHER PUBLICATIONS

Communication dated Apr. 30, 2018 from the European Patent Office in counterpart European application No. 16743461.2.
(Continued)

*Primary Examiner* — Robert C Dye
*Assistant Examiner* — Edgaredmanuel Troche
(74) *Attorney, Agent, or Firm* — Sughrue Mion, PLLC

(57) ABSTRACT

This pneumatic tire has a tread part partitioned by four main grooves into a center land part, an outer intermediate land part, an inner intermediate land part, an outer shoulder land part, and an inner shoulder land part. The center land part is formed with center lug grooves in which the installation outer side is narrower than the installation inner side. The outer intermediate land part is wider than the inner intermediate land part, and the outer shoulder land part is wider than the inner shoulder land part. In the outer (inner) intermediate land part, outer (inner) intermediate first lug grooves which communicate with the main grooves on both sides, and outer (inner) intermediate second lug grooves
(Continued)

which communicate only with the main groove on the outside (inside) in the tire width direction are alternatingly arranged in the tire circumferential direction.

18 Claims, 2 Drawing Sheets

(51) Int. Cl.
    *B60C 11/13*           (2006.01)
    *B60C 11/11*           (2006.01)

(52) U.S. Cl.
    CPC .............. *B60C 11/12* (2013.01); *B60C 11/13* (2013.01); *B60C 11/1369* (2013.01); *B60C 2011/0348* (2013.01); *B60C 2011/0353* (2013.01); *B60C 2011/0365* (2013.01); *B60C 2011/0367* (2013.01); *B60C 2011/0381* (2013.01); *B60C 2011/1209* (2013.01); *B60C 2011/1245* (2013.01); *B60C 2011/1254* (2013.01); *B60C 2011/1361* (2013.01)

(58) Field of Classification Search
    USPC .................................................... 152/209.27
    See application file for complete search history.

(56) References Cited

U.S. PATENT DOCUMENTS

| | | | |
|---|---|---|---|
| 2011/0041972 A1 | 2/2011 | Kageyama | |
| 2012/0132334 A1 | 5/2012 | Nomura | |
| 2012/0291934 A1* | 11/2012 | Iwabuchi | B60C 11/0306 |
| | | | 152/209.18 |
| 2013/0087261 A1 | 4/2013 | Kageyama | |
| 2013/0112325 A1 | 5/2013 | Mukai | |
| 2013/0118663 A1* | 5/2013 | Kishizoe | B60C 11/12 |
| | | | 152/209.18 |
| 2013/0167994 A1* | 7/2013 | Hada | B60C 11/0306 |
| | | | 152/209.8 |
| 2013/0192731 A1 | 8/2013 | Oji | |
| 2013/0240100 A1* | 9/2013 | Miyoshi | B60C 11/1218 |
| | | | 152/209.18 |
| 2014/0305564 A1* | 10/2014 | Sueno | B60C 11/0306 |
| | | | 152/209.18 |

FOREIGN PATENT DOCUMENTS

| | | |
|---|---|---|
| EP | 2578418 A1 | 4/2013 |
| EP | 2 610 081 A2 | 7/2013 |
| EP | 3 081 397 A1 | 10/2016 |
| JP | 2011-42328 A | 3/2011 |
| JP | 2011-136656 A | 7/2011 |
| JP | 2012-116306 A | 6/2012 |
| JP | 2013-100020 A | 5/2013 |
| JP | 2013-151289 A | 8/2013 |
| JP | 2013-173521 A | 9/2013 |
| JP | 2013-248927 A | 12/2013 |
| WO | 2009/057780 A1 | 5/2009 |
| WO | 2014/038378 A1 | 3/2014 |

OTHER PUBLICATIONS

Communication dated Feb. 8, 2018, from European Patent Office in counterpart application No. 16 74 3461.
International Search Report for PCT/JP2016/052459 dated Mar. 29, 2016 [PCT/ISA/210].
Communication dated Oct. 23, 2018, from the State Intellectual Property Office of People's Republic of China in counterpart Application No. 201680007921.8.

\* cited by examiner

PNEUMATIC TIRE

CROSS REFERENCE TO RELATED APPLICATIONS

This application is a National Stage of International Application No. PCT/JP2016/052459, filed on Jan. 28, 2016, which claims priority from Japanese Patent Application No. 2015-016379, filed on Jan. 30, 2015, the contents of all of which are incorporated herein by reference in their entirety.

TECHNICAL FIELD

The present invention relates to a pneumatic tire having a tread part partitioned by four main grooves, which extend in the tire circumferential direction, into a center land part, an outer intermediate land part adjoining the vehicle installation outer side of the center land part, an inner intermediate land part adjoining the vehicle installation inner side of the center land part, an outer shoulder land part adjoining the vehicle installation outer side of the outer intermediate land part, and an inner shoulder land part adjoining the vehicle installation inner side of the inner intermediate land part.

BACKGROUND ART

A pneumatic tire is normally provided with a carcass ply laid across a pair of bead cores, a belt layer arranged on the tire radial outer side of the carcass ply, and a tread part arranged on the tire radial outer side of the belt layer.

In addition, a tread pattern of the tread part is devised in various ways (see Patent Literature 1) in order to improve various tire performance such as drainage efficiency, operation stability, a traction property and a braking property

CITATION LIST

Patent Literature

Patent Literature 1: JP 2012-116306 A

SUMMARY OF INVENTION

Technical Problem

Considering lateral force which acts on a tire in cornering, the rigidity of a grounded part on the installation outer side of a pneumatic tire is preferably higher than that of the installation inner side from the perspective of operation stability.

However, drainage efficiency and operation stability are contrary natures and, when one performance is enhanced, the other performance tends to lower under existing circumstances. That is, when operation stability is enhanced by increasing the rigidity of a grounded part on the installation outer side, the drainage efficiency at the wheel tread tends to deteriorate under existing circumstances.

The present invention has been made in view of such a problem, and the object thereof is to provide a pneumatic tire having improved operation stability in cornering while maintaining drainage performance.

Solution to Problem

A pneumatic tire according to a first aspect of the present invention has a tread part partitioned by four main grooves extending in a tire circumferential direction. The tire includes a center land part, an outer intermediate land part adjoining an installation outer side of the center land part, an inner intermediate land part adjoining an installation inner side of the center land part, an outer shoulder land part adjoining an installation outer side of the outer intermediate land part, and an inner shoulder land part adjoining an installation inner side of the inner intermediate land part. A center lug groove having a smaller width on an installation outer side than on an installation inner side is formed in the center land part. The outer intermediate land part has a width larger than a width of the inner intermediate land part. The outer shoulder land part has a width larger than a width of the inner shoulder land part, The outer intermediate land part has an outer intermediate first lug groove having both ends in a tire transversal direction communicating with main grooves, an outer intermediate second lug groove having one end on a tire transversal outer side communicating with a main groove and the other end on a tire transversal inner side terminating in the outer intermediate land part. The outer intermediate first lug groove and the outer intermediate second lug groove are arranged alternately in a tire circumferential direction. The inner intermediate land part has an inner inter intermediate first lug groove having both ends in a tire transversal direction communicating with main grooves and an inner intermediate second lug groove having one end on a tire transversal inner side communicating with a main groove and the other end on a tire transversal outer side terminating in the inner intermediate land part. The inner intermediate first lug groove and the inner intermediate second lug groove are arranged. alternately in a tire circumferential direction. Accordingly, the pneumatic tire can improve operation stability in cornering while maintaining drainage performance.

The outer intermediate first lug groove formed in the outer intermediate land part may have a bent part. This further improves the steerability when lateral force acts from the installation outer side toward the installation inner side in cornering. Besides, formation of a bend part increases a snow column shearing effect, and also provides an effect of improving the operation stability on snow road surface.

An outer circumferential sipe extending in a tire circumferential direction may be formed in the outer shoulder land part, and an inner circumferential narrow groove extending in a tire circumferential direction and having a width larger than a width of the outer circumferential sipe may be formed in the inner shoulder land part. This can sufficiently suppress harmful influence of rigidity reduction of the outer shoulder land part due to formation of the circumferential narrow groove while increasing the drainage efficiency with the outer circumferential sipe and the inner circumferential narrow groove.

An outer intermediate sipe formed in the outer intermediate land part may have both ends terminating in the outer intermediate land part, and a center sipe formed in the center land part may have one end part communicating with the center lug groove and the other end part terminating in the center land part. This can improve the operation stability by sufficiently suppressing rigidity reduction of the center land part due to sipe formation in comparison with a conventional structure even when the center sipes are formed in the center land part.

A sipe density of an area on a tire center side of the outer shoulder land part partitioned by the outer circumferential sipe may be lower than sipe density of an area on a tire center side of the inner shoulder land part partitioned by the inner circumferential narrow groove. This can improve the operation stability in cornering by minimizing rigidity reduction of the outer shoulder land part while improving the drainage efficiency.

A groove width sudden change part may be formed in the center lug groove and the center lug groove may have a smaller width on an installation outer side than on an installation inner side. This exerts a large snow column shearing effect at the groove width sudden change part and improves the operation stability on snow road surface.

An inner intermediate sipe formed in the inner intermediate land part may include a first sipe extending in a tire circumferential direction so as to couple the inner intermediate first lug groove and the inner intermediate second lug groove, and a second sipe inclined in a direction opposite to the first sipe with respect to tire equatorial line in an area between the inner intermediate first lug groove and the inner intermediate second lug groove and not connected with the first sipe. This provides an effect of improving the drainage efficiency by forming the first sipes and the second sipes inclined in directions opposite to each other. Moreover, since the first sipes and the second sipes are not connected with each other, rigidity reduction can be minimized.

A pneumatic tire according to a second aspect of the present invention has a tread part partitioned by four main grooves extending in a tire circumferential direction. The tire includes a center land part, an outer intermediate land part adjoining an installation outer side of the center land part, an inner intermediate land part adjoining an installation inner side of the center land part, an outer shoulder land part adjoining an installation outer side of the outer intermediate land part, and an inner shoulder land part adjoining an installation inner side of the inner intermediate land part. A center lug groove having both ends respectively communicating with main grooves and having a smaller width on an installation outer side than on an installation inner side is formed in the center land part. The outer intermediate land part has a width larger than a width of the inner intermediate land part. The outer shoulder land part has a width larger than a width of the inner shoulder land part. A center sipe is formed in the center land part. An outer intermediate sipe is formed in the outer intermediate land part. An inner intermediate sipe is formed in the inner intermediate land part. A sipe angle of the outer intermediate sipe is larger than a sipe angle of the center sipe and the inner intermediate sipe. This can increase the rigidity of a land part on the outer side so as to improve the operation stability in cornering while maintaining drainage performance. Furthermore, since snow is compressed in a small width portion of the center lug grooves, snow road movement performance can be improved.

The outer intermediate land part may have an outer intermediate lug groove at least one end on a tire transversal outer side communicating with a main groove. The outer intermediate lug groove may include an outer intermediate first lug groove having both tire transversal end parts communicating with main grooves. A bend part may be formed in the outer intermediate first lug groove. Snow is stemmed and compressed at the bend parts, and therefore the snow road movement performance is improved.

A center shallow groove part having a groove depth smaller than a groove depth of the main grooves may be formed in the center lug groove. The center shallow groove part may be provided with a plurality of center shallow groove bottom-raised parts arranged at both tire transversal end parts apart from each other in a tire transversal direction and obtained by raising a bottom of the center shallow groove part. This effectively presses snow together at the center shallow groove part between the center shallow groove bottom-raised parts and the ground surface and sandwiches a formed snow column in the center shallow groove bottom-raised parts, and therefore improves the snow road movement performance.

The center shallow groove bottom-raised parts may be formed at an opening part opened to a main groove on a tread transversal inner side, and may be formed at an outer center lug groove opened to a main groove on a tread transversal outer side and having a small groove width. A groove depth of the center shallow groove part may become the smallest at a center shallow groove bottom-raised part formed at the opening part and may become the largest at a position sandwiched between the opening part and the outer center lug groove in the center shallow groove part. This can compress snow more efficiently and improve the snow road movement performance.

The outer intermediate land part may have an outer intermediate lug groove at least one end on a tire transversal outer side communicating with a main groove. An outer intermediate shallow groove part having a groove depth smaller than a groove depth of the main grooves may be formed in the outer intermediate lug groove. The outer intermediate shallow groove part may be provided with a plurality of outer intermediate shallow groove bottom-raised parts positioned apart from each other in a tire transversal direction and obtained by raising a bottom of the outer intermediate shallow groove part. Both end parts of the outer intermediate shallow groove part may be arranged apart from an opening position where the outer intermediate lug groove communicates with a main groove. This effectively presses snow together at the outer intermediate shallow groove part between the outer intermediate shallow groove bottom-raised parts and the ground surface and sandwiches a formed snow column in the outer intermediate shallow groove bottom-raised parts, and therefore improves the snow road movement performance.

The inner intermediate land part may have an inner intermediate lug groove at least one end on a tire transversal inner side communicating with a main groove. An inner intermediate shallow groove part having a groove depth smaller than a groove depth of the main grooves may he formed in the inner intermediate lug groove. The inner intermediate shallow groove part may be provided with a plurality of inner intermediate shallow groove bottom-raised parts positioned apart from each other in a tire transversal direction and obtained by raising a bottom of the inner intermediate shallow groove part. Both end parts of the inner intermediate shallow groove part may be arranged apart from an opening position where the inner intermediate lug groove communicates with a main groove. This effectively presses snow together at the inner intermediate shallow groove part between the inner intermediate shallow groove bottom-raised parts and the ground surface. and sandwiches a formed snow column in the inner intermediate shallow groove bottom-raised parts, and therefore improves the snow road movement performance.

The main grooves may include a widest main groove having a largest width in a tread transversal direction and positioned closest to tire equatorial line. Effective drainage can he achieved around the tire equatorial line where drainage is difficult, and the drainage performance is improved.

The main grooves may include a narrowest main groove having a smallest width in a tread transversal direction and being a main groove defining the outer shoulder land part. The rigidity reduction of an outer land part can be suppressed and the operation stability in cornering is improved.

The outer intermediate sipe formed in the outer intermediate land part may be a sipe having both ends terminating in the outer intermediate land part. The outer intermediate sipe may have a tread transversal outer end part laid on a tread transversal position of an outer intermediate shallow groove bottom-raised part. This suppresses rigidity reduction of a sipe end part where rigidity tends to reduce, and improves the operation stability in cornering.

The inner intermediate land part may have an inner intermediate lug groove at least one end on a tire transversal inner side communicating with a main groove. The inner intermediate sipe may be positioned in an area between inner intermediate lug grooves adjoining each other in a tire circumferential direction. The inner intermediate sipe may have a first sipe inclined in a direction opposite to the inner intermediate lug groove in a tire circumferential direction, and may have a second sipe arranged apart from the first sipe. Since the sipes do not intersect with each other, rigidity reduction is suppressed and thus uneven abrasion is suppressed. Furthermore, even when a vehicle turns to any direction, snow road movement performance by an edge component is improved.

Both ends of the first sipe may be formed to communicate with the inner intermediate lug groove. At least one end part of the first sipe may communicate with an inner intermediate shallow groove bottom-raised part. Since the rigidity reduction is suppressed, uneven abrasion is suppressed and falling of the sipe is suppressed.

The center sipe may be inclined in a direction opposite to the center lug groove in a tire circumferential direction and intersects center line of the center land part extending through a tread transversal middle. The outer intermediate land part may have an outer intermediate first lug groove having both ends in a tire transversal direction communicating with main grooves, and an outer intermediate second lug groove having one end on a tire transversal outer side communicating with a main groove and the other end on a tire transversal inner side terminating in the outer intermediate land part. The outer intermediate first lug groove and the outer intermediate second lug groove may be arranged alternately in a tire circumferential direction. The inner intermediate land part may have an inner intermediate first lug groove having both ends in a tire transversal direction communicating with main grooves, and an inner intermediate second lug groove having one end on a tire transversal inner side communicating with a main groove and the other end on a tire transversal outer side terminating in the inner intermediate land part. The inner intermediate first lug groove and the inner intermediate second lug groove may be arranged alternately in a tire circumferential direction. This provides the sipes inclined in a direction opposite to the lug grooves, and therefore improves the snow road movement performance by an edge component even in a case of turning to any direction. Furthermore, since the sipes are provided at the land part middle where the grounded pressure is high, the edge component functions effectively.

DESCRIPTION OF EMBODIMENTS

The following description explain an embodiment of the present invention with reference to the appended drawings. It is to be noted that identical or similar signs are attached to identical or similar parts in the following description on the drawings. Moreover, the following embodiment is an illustration for embodying the technical idea of the present invention, and the embodiment of the present invention does not limit the material, shape, structure, arrangement or the like of components to the following. The embodiment of the present invention can be modified in various ways and implemented without departing from the scope of the invention.

Figure 1:
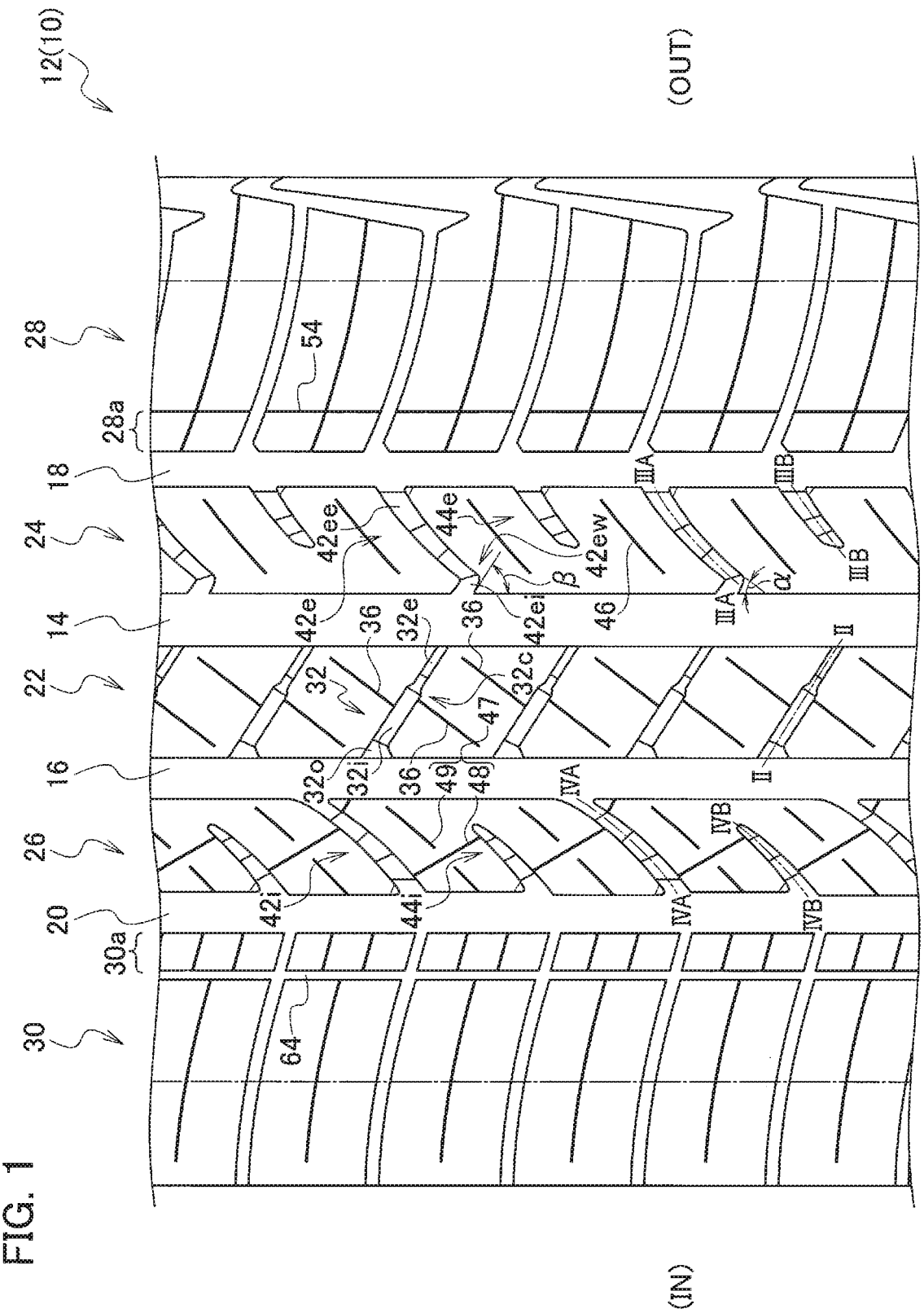
FIG. 1 is a plane view describing a tread pattern of a pneumatic tire according to one embodiment of the present invention.

FIG. 1 is a plan view for explaining a tread pattern of a pneumatic tire according to one embodiment (which will be hereinafter referred to as the present embodiment) of the present invention. A pneumatic tire 10 of the present embodiment is provided with a belt layer on the tire radial outer side of a carcass ply, and a tread part 12 on the tire radial outer side of the belt layer.

The tread part 12 is partitioned by four main grooves 14, 16, 18, 20, which extend in the tire circumferential direction, into a center land part 22, an outer intermediate land part 24 adjoining the installation outer side of the center land part 22, an inner intermediate land part 26 adjoining the installation inner side of the center land part 22, an outer shoulder land part 23 adjoining the installation outer side of the outer intermediate land part 24, and an inner shoulder land part 30 adjoining the installation inner side of the inner intermediate land part 26. In the present embodiment, each main groove is formed as a straight groove, which extends linearly along the tire circumferential direction. Such a straight groove can smoothly drain a water film, which is interposed between the road surface and the tread grounded surface, to the outside in straight driving and in cornering, and can improve the drainage performance. It is to be noted that a main groove (widest main groove) 14, which is positioned closest to the tire equatorial line, is formed to have the largest width in the tread transversal direction. In addition, a main groove (thinnest main groove) 18, which defines the outer shoulder land part 28, is formed to have the smallest width in the tread transversal direction.

Center lug grooves 32 are formed in the center land part 22 so as to have a smaller width on the installation outer side than on the installation inner side. Moreover, the tire equatorial line extends through the center lug grooves 32 in the present embodiment.

Moreover, a groove width sudden change part 32c is formed in each center lug groove 32, so that the center lug groove 32 has a smaller width on the installation outer side than on the installation inner side. In the present embodiment, each center groove 32 is composed of an outer center lug groove 32e, which communicates with the main groove 14 on the installation outer side, and an inner center lug groove 32i, which communicates with a main groove 16 on the installation inner side, and the groove width sudden change part 32c is formed as a connection part between the outer center lug groove 32e and the inner center lug groove 32i.

Figure 2:
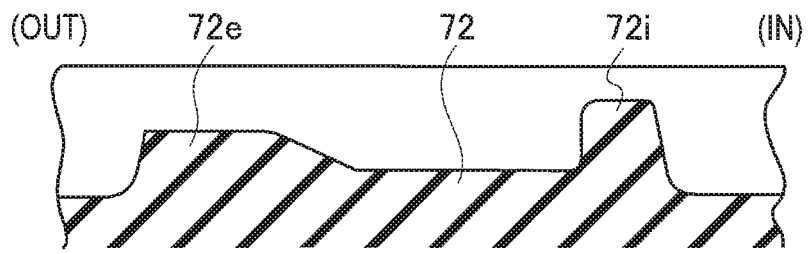
FIG. 2 is a cross-sectional view describing a center lug groove of a pneumatic tire according to one embodiment of the present invention.
Figure 3A:
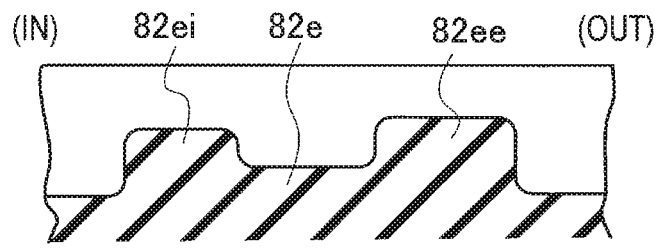
FIG. 3A is a cross-sectional view describing an outer intermediate first lug groove of a pneumatic tire according to one embodiment of the present invention.
Figure 3B:
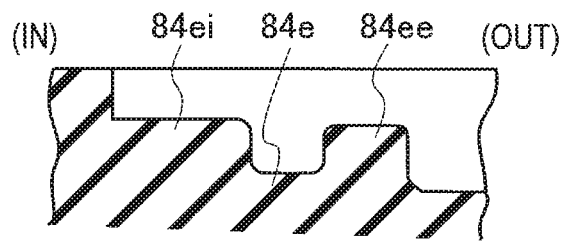
FIG. 3B is a cross-sectional view describing an outer intermediate second lug groove of a pneumatic tire according to one embodiment of the present invention.
Figure 4A:
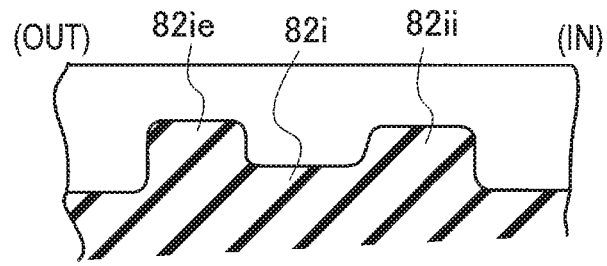
FIG. 4A is a cross-sectional view describing an inner intermediate first lug groove of a pneumatic tire according to one embodiment of the present invention.
Figure 4B:
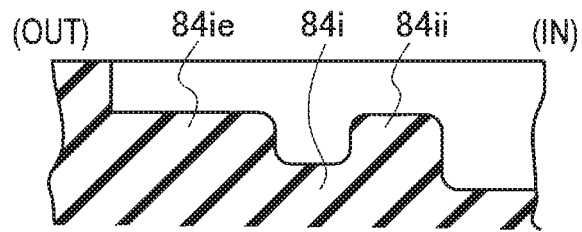
FIG. 4B is a cross-sectional view describing an inner intermediate second lug groove of a pneumatic tire according to one embodiment of the present invention.

FIGS. 2 to 4B are sectional views for explaining a lug groove of a pneumatic tire according to one embodiment of the present invention. FIG. 2 is a sectional view of the center lug groove 32. FIG. 3A is a sectional view of an outer intermediate first lug groove 42e. FIG. 3B is a sectional view of an outer intermediate second lug groove 44e. FIG. 4A is a sectional view of an inner intermediate first lug groove 42i. FIG. 4B is a sectional view of an inner intermediate second lug groove 44i.

In each center lug groove 32, a center shallow groove part 72 having a smaller groove depth than that of a main groove is formed over the total width of the center lug groove 32. The center shallow groove part 72 is provided with a plurality of center shallow groove bottom-raised parts 72e, 72i, which are arranged at both tire transversal end parts apart from each other in the tire transversal direction and are obtained by raising the bottom of the center shallow groove part 72 over the total width of the center lug groove 32.

The center shallow groove bottom-raised parts 72e, 72i are formed at an opening part 32o of each inner center lug groove 32i, which opens to the main groove 16 on the tread transversal inner side, and at each outer center lug groove 32e, which opens to the main groove 14 on the tread transversal outer side and has a small groove width. The groove depth of the center shallow groove part 72 becomes the smallest at the center shallow groove bottom-raised part 72i formed at the opening part 32o, and becomes the largest at a position sandwiched between the outer center lug groove 32e and the opening part 32o in the center shallow groove part 72, that is, the groove depth of the center shallow groove part 72, the bottom of which is not raised, becomes the largest.

The width of the outer intermediate land part 24 is larger than that of the inner intermediate land part 26, and the width of the outer shoulder land part 28 is larger than that of the inner shoulder land part 30.

The outer intermediate land part 24 has the outer intermediate lug grooves 42e, 44e. The outer intermediate lug grooves 42e, 44e are composed of: an outer intermediate first lug groove 42e communicating with main grooves 14, 18 on both sides; and an outer intermediate second lug groove 44e, which communicates only with the main groove 18 on the tire transversal outer side, or in other words, has one end communicating with the main groove 18 on the installation outer side adjoining the outer intermediate land part 24 and the other end terminating in the outer intermediate land part 24, and are arranged alternately in the tire circumferential direction. The inner intermediate land part 26 has the inner intermediate lug grooves 42i, 44i. The inner intermediate lug grooves 42i, 44i are composed of: an inner intermediate first lug groove 42i communicating with the main grooves 16, 20 on both sides; and an inner intermediate second lug groove 44i, which communicates only with the main groove 20 on the tire transversal outer side, or in other words, has one end communicating with the main groove 20 on the installation inner side adjoining the inner intermediate land part 26 and the other end terminating in the inner intermediate land part 26, and are arranged alternately in the tire circumferential direction.

Each outer intermediate first lug groove 42e formed in the outer intermediate land part 24 is composed of an outer groove part 42ee communicating with the main groove 18, and an inner groove part 42ei communicating with the main groove 14. The inclination directions of the outer groove part 42ee and the inner groove part 42ei are opposite to each other, and an end part of the outer groove part 42ee and an end part of the inner groove part 42ei are coupled with each other. With such a structure, the outer groove part 42ee and the inner groove part 42ei form a bend part 42ew.

In the present embodiment, assuming that the bend part 42ew is not formed, that is, assuming that each outer groove part 42ee is extended to the main groove 14 so as to open to the main groove 14 without forming the inner groove part 42ei, an acute angle β formed by the inner groove part 42ei and the main groove 14 is larger than an acute angle α formed by the outer groove part 42ee and the main groove 14. In other words, by forming the inner groove part 42ei at such an acute angle β to the main groove 14, the rigidity of a land part around a coupling part of the main groove 14 and the outer intermediate first lug groove 42e (inner groove part 42ei) becomes high.

The outer intermediate land part 24 has the outer intermediate lug grooves 42e, 44e, at least one end of which on the tire transversal outer side communicates with the main groove 18. In the outer intermediate lug grooves 42e, 44e, outer intermediate shallow groove parts 82e, 84e having a groove depth smaller than that of the main grooves 14, 18 are formed over the total width of the outer intermediate lug grooves 42e, 44e. The outer intermediate shallow groove parts 82e, 84e are provided with a plurality of outer intermediate shallow groove bottom-raised parts 82ee, 82ei, 84ee, 84ei, which are positioned apart from each other in the tire transversal direction and are obtained by raising the bottom of the outer intermediate shallow groove parks 82e, 84e over the total width of the outer intermediate lug grooves 42e, 44e. Both end parts of the outer intermediate shallow groove parts 82e, 84e are arranged apart from opening positions where the outer intermediate lug grooves 42e, 44e communicate with the main grooves 14, 18.

The inner intermediate land part 26 has the inner intermediate lug grooves 42i, 44i, at least one end of which on the tire transversal inner side communicates with the main groove 20. In the inner intermediate lug grooves 42i, 44i, inner intermediate shallow groove parts 82i, 84i having a groove depth smaller than that of the main grooves 16, 20 are formed over the total width of the inner intermediate lug grooves 42i, 44i. The inner intermediate shallow groove parts 82i, 84i are provided with a plurality of inner intermediate shallow groove bottom-raised parts 82ie, 82ii, 84ie, 84ii, which are positioned apart from each other in the tire transversal direction and are obtained by raising the bottom of the inner intermediate shallow groove parts 82i, 84i over the total width of the inner intermediate lug grooves 42i, 44i. Both end parts of the inner intermediate shallow groove parts 82i, 84i are arranged apart from opening positions where the inner intermediate lug grooves 42i, 44i communicate with the main grooves 16, 20.

Outer intermediate sipes 46 are formed in the outer intermediate land part 24. Center sipes 36 are formed in the center land part 22. Inner intermediate sipes 47 are formed in the inner intermediate land part 26.

Both ends of the outer intermediate sipes 46 formed in the outer intermediate land part 24 terminate in the outer intermediate land part 24. A tread transversal outer end part of each outer intermediate sipe 46 is arranged at a position which coincides with the tread transversal position of the outer intermediate shallow groove bottom-raised part 82ee. In addition, the sipe angle of the outer intermediate sipes 46 is smaller than the sipe angle of the center sipes 36 and the inner intermediate sipes 47. It is to be noted that a sipe angle shall mean an angle of straight line, which connects both tire transversal ends of a sipe, to the tire circumferential direction.

Each center sipe 36 formed in the center land part 22 communicates with a center lug groove 32 at one side end, and terminates in the center land part 22 in the other side end. The center sipes 36 are inclined in a direction opposite to the center lug grooves 32 with respect to the tire circumferential direction. The center sipes 36 intersect the center line of the center land part 22, which extends through the tread transversal middle.

An outer circumferential sipe 54 extending in the tire circumferential direction is formed in the outer shoulder land part 28. An inner circumferential narrow groove 64, which extends in the tire circumferential direction and has a width larger than that of the outer circumferential sipe 54, is formed in the inner shoulder land part 30.

In addition, the sipe density of an area 28a on the tire center side defined by the outer circumferential sipe 54 in the outer shoulder land part 28 is lower than the sipe density of an area 30a on the tire center side defined by the inner circumferential narrow groove 64 in the inner shoulder land pad 30.

Each inner intermediate sipe 47 formed in the inner intermediate land part 26 is composed of: a first sipe 48, which extends in the tire circumferential direction so as to couple the inner intermediate first lug groove 42i and the inner intermediate second lug groove 44i; and a second sipe 49, which is inclined in a direction opposite to the first sipe 48 with respect to the tire equatorial line in an area between the inner intermediate first lug groove 42i and the inner intermediate second lug groove 44i and is not connected with any first sipe 48.

It is to be noted that the sipe angle of the first sipes 48 is inclined in a direction opposite to the inner intermediate first lug grooves 42i and the inner intermediate second lug grooves 44i with respect to the tire circumferential direction. In addition, both ends of the first sipes 48 are formed to communicate with the inner intermediate shallow groove bottom-raised parts 82ii, 84ie of the inner intermediate lug grooves 42i, 44i.

(Action, Effect)

The following description will explain the action and effect of the present embodiment.

In the present embodiment wherein the center lug grooves 32 are formed in the center land part 22 so as to have a smaller width in the installation outer side than in the installation inner side, the rigidity of a land part on the installation outer side of the center land part 22 becomes higher than the rigidity of a land part on the installation inner side, and furthermore, the drainage efficiency on the installation inner side can be enhanced in comparison with the installation outer side. Accordingly, it is possible to realize a pneumatic tire 10 having improved operation stability in cornering while maintaining the drainage performance. It is to be noted that such a character becomes more effective for the user from the perspective of convenience in a case where the pneumatic tire 10 is used in a region where a tire can be used in all seasons without preparing tires for snow road surface (snow-covered road surface) and tires for normal road surface according to the quality of snow which falls on the road surface.

Moreover, the outer intermediate land part 24 has a width larger than that of the inner intermediate land part 26, and the outer shoulder land part 28 has a width larger than that of the inner shoulder land park 30. Accordingly, it is possible to effectively improve the land part rigidity in an installation outer half part of the tread part 12 in comparison with an installation inner half part of the tread part 12, and further improve the operation stability.

Besides, the outer intermediate land part 24 has an arrangement structure wherein the outer intermediate first lug grooves 42e communicating with main grooves on both sides and the outer intermediate second lug grooves 44e communicating only with a main groove on the tire transversal outer side are arranged alternately in the tire circumferential direction, and the inner intermediate first lug grooves 42i and the inner intermediate second lug grooves 44i are arranged alternately in the tire circumferential direction. With such a structure, the land part rigidity becomes high and the steerability can be further remarkably improved in comparison with a case where all lug grooves formed in the outer intermediate land part 24 and the inner intermediate land part 26 communicate with main grooves on both sides.

Moreover, each outer intermediate first lug groove 42e formed in the outer intermediate land part 24 is composed of an outer groove part 42ee communicating with the main groove 18, and an inner groove part 42ei communicating with the main groove 14. The inclination directions of the outer groove part 42ee and the inner groove part 42ei are opposite to each other, and a tip part of the outer groove part 42ee and a tip part of the inner groove part 42ei are coupled with each other. With such a structure, an outer groove part 42ee and an inner groove part 42ei form a bent part 42ew. This further improves the steerability when lateral force acts from the installation outer side toward the installation inner side in cornering. In the present embodiment, an acute angle β formed by an inner groove part 42ei and the main groove 14 is larger than the aforementioned acute angle α, and therefore the rigidity of coupling parts of the main groove 14 and the outer intermediate first lug grooves 42e (inner groove parts 42ei) can be increased with a simple structure.

Besides, formation of a bend part 42ew increases a snow column shearing effect, and also provides an effect of improving the operation stability on snow road surface.

Moreover, the outer circumferential sipe 54 extending in the tire circumferential direction is formed in the outer shoulder land part 28, and the inner circumferential narrow groove 64, which extends in the tire circumferential direction and has a width larger than that of the outer circumferential sipe 54, is formed in the inner shoulder land part 30. This can sufficiently suppress harmful influence of rigidity reduction of the outer shoulder land part 28 due to formation of the circumferential narrow groove while increasing the drainage efficiency with the outer circumferential sipe 54 and the inner circumferential narrow groove 64.

Moreover, the outer intermediate sipes 46 formed in the outer intermediate land part 24 terminate in the outer intermediate land part 24. This can further increase the drainage efficiency of the outer intermediate land part 24 with the outer intermediate sipes 46, and further can sufficiently suppress rigidity reduction of the outer intermediate land part 24 due to the outer intermediate sipes 46.

In addition, each center sipe 36 formed in the center land part 22 has one side end communicating with a center lug groove 32 and the other side end terminating in the center land part 22. This can improve the operation stability by sufficiently suppressing rigidity reduction of the center land part 22 due to sipe formation in comparison with a conventional structure even when the center sipes 36 are formed in the center land part 22. It is to be noted that the drainage efficiency tends to be insufficient when the center sipes 36 do not open to any center lug groove 32 and all sipes terminate in the center laud part 22.

Moreover, the sipe density of the area 28*a* on the tire center side defined by the outer circumferential sipe 54 in the outer shoulder land part 28 is lower than the sipe density of the area 30*a* on the tire center side defined by the inner circumferential narrow groove 64 in the inner shoulder land part 30. This can improve the operation stability in cornering by minimizing rigidity reduction of the outer shoulder land part 28 while improving the drainage efficiency.

Moreover, since the groove width sudden change parts 32*e* are formed in the center lug grooves 32, the center lug grooves 32 have a smaller width on the installation outer side than on the installation inner side. This exerts a large snow column shearing effect at the groove width sudden change part and improves the operation stability on snow road surface.

Moreover, each inner intermediate sipe 47 formed in the inner intermediate land part 26 is composed of: a first sipe 48 extending in the tire circumferential direction so as to couple an inner intermediate first lug groove 42*i* and an inner intermediate second lug groove 44*i*; and a second sipe 49, which is inclined in a direction opposite to the first sipe 48 with respect to the tire equatorial line and is not connected with any first sipe 48. This provides an effect of improving the drainage efficiency by forming the first sipes 48 and the second sipes 49 inclined in directions opposite to each other. Moreover, since the first sipes 48 and the second sipes 49 are not connected with each other, rigidity reduction can be minimized.

In the present embodiment wherein the land part width in the tread transversal direction is large on the installation outer side of the tire, rigidity is large. This can increase the rigidity of a land part on the outer side so as to improve the operation stability in cornering. In addition, since the center lug grooves 32 are formed to have a groove width becoming smaller on the outer side, the rigidity on the installation outer side of the center lug grooves 32 is increased, and therefore the operation stability in cornering can be improved. Furthermore, since snow is compressed in the outer center lug grooves 32*e*, which have a small groove width, of the center lug grooves 32, snow road movement performance can be improved. Moreover, since the sipe angle of the outer intermediate sipes is the largest, reduction of rigidity is suppressed, and the operation stability in cornering can be improved.

Since the outer intermediate land part 24 has the outer intermediate lug grooves 42*e*, 44*e*, at least one end of which on the tire transversal direction communicates with a main groove, and the bend parts 42*ew* are formed in the outer intermediate lug grooves 42*e*, snow is stemmed and compressed at the bend parts 42*ew*, and therefore the snow road movement performance is improved.

The center shallow groove part 72 having a groove depth smaller than that of the main grooves 14, 16 is formed in each center lug groove 32, and a plurality of center shallow groove bottom-raised parts 72*e*, 72*i*, which are arranged at both tire transversal end parts apart from each other in the tire transversal direction and are obtained by raising the bottom of the center shallow groove part 72, are provided in the center shallow groove part 72. This effectively presses snow together at the center shallow groove part 72 between the center shallow groove bottom-raised parts 72*e*, 72*i* and the ground surface and sandwiches a formed snow column in the center shallow groove bottom-raised parts 72*e*, 72*i*, and therefore improves the snow road movement performance.

The center shallow groove bottom-raised parts 72*e*, 72*i* are formed at the opening parts 32*o* opening to a main groove on the tread transversal inner side and at the outer side to the center lug groove 32*e*, which open to the main groove 14 on the tread transversal outer side and have a small groove width. The groove depth of each center shallow groove part 72 becomes the smallest in the center shallow groove bottom-raised part 72*i* formed in the opening part 32*o*, and becomes the largest at a position, which is sandwiched between the opening part 32*o* and the outer center lug groove 42*ee*, in the center shallow groove part 72. This can compress snow more efficiently and improve the snow road movement performance.

Snow in the outer intermediate land part 24 is pressed together effectively from three sides between the outer intermediate shallow groove bottom-raised parts 82*ee*, 82*ei* (84*ee*, 84*ei*) and the road surface so that a strong snow column is formed, and the formed snow column is further sandwiched between the outer intermediate shallow groove bottom-raised parts 82*ee*, 82*ei* (84*ee*, 84*ei*), and therefore the snow road movement performance is improved.

Snow in the inner intermediate land part 26 is pressed together effectively from three sides between the inner intermediate shallow groove bottom-raised parts 82*ie*, 82*ii* (84*ie*, 84*ii*) and the road surface so that a strong snow column is formed, and the formed snow column is further sandwiched between the inner intermediate shallow groove bottom-raised parts 82*ie*, 82*ii* (84*ie*, 84*ii*), and therefore the snow road movement performance is improved.

The main groove 14 positioned closest to the tire equatorial line has the largest width in the tread transversal direction. Therefore, the thickest main groove 14 is arranged around the tire equatorial line where drainage is difficult, so that effective drainage can be achieved and the drainage performance is improved.

The main groove 18 which defines the outer shoulder land part 28 has the smallest width in the tread transversal direction. Therefore, the rigidity reduction of an outer land part can be suppressed and the operation stability in cornering is improved.

Each outer intermediate sipe 46 formed in the outer intermediate land part 24 is a sipe having both ends terminating in the outer intermediate land part 24, and each outer intermediate sipe 46 has a tread transversal outer end part laid on the tread transversal position of the outer intermediate shallow groove bottom-raised parts 82*ee*, 84*ee*. This suppresses rigidity reduction of a sipe end part where rigidity tends to reduce, and improves the operation stability in cornering.

Since the first sipe 48 and the second sipe 49 of each inner intermediate sipe 47 do not intersect, rigidity reduction is suppressed and uneven abrasion is suppressed. Furthermore, even when a vehicle turns to any direction from a straight driving state, snow road movement performance by an edge component is improved.

Each first sipe 48 is formed so that both ends communicate with the inner intermediate lug grooves 42*i*, 44*i*, and both end parts communicate with the inner intermediate shallow groove bottom-raised parts 82*ii*, 84*ie*. This suppresses rigidity reduction, and therefore suppresses uneven abrasion and suppresses falling of the sipe.

The center sipes 36 are inclined in a direction opposite to the center lug grooves 32 with respect to the tire circumferential direction, and intersect the center line of the center land part 22, which extends through the tread transversal middle. This provides the center sipes 36 inclined in a direction opposite to the center lug grooves 32, and therefore improves the snow road movement performance by an edge component even in a case of turning to any direction from a straight driving state. Furthermore, since the sipes 36 are provided at the land part middle where the grounded pressure is high, the edge component functions effectively.

EXAMPLES

The present inventors used Examples 1 to 5 as a pneumatic tire 10 of the above embodiment, and Comparative Examples 1 to 3 as a conventional pneumatic tire to make performance evaluation regarding operation stability, operation stability on normal road surface, operation stability on snow road surface, drainage efficiency and abrasion resistance by running tests. Tire conditions and evaluation results are shown in Table 1. It is to be noted that the common following conditions are used as the tire size, rim width and tire internal pressure for all examples.
The Size: 215/55R17
Rim Width: 7.0 J
Internal Pressure: 220 kPa municating with main grooves, are arrayed in the tire circumferential direction (that is, any lug groove, which has only one end communicating with a main groove, is not formed). Moreover, shown as the sipe density of the shoulder land part is a value obtained by dividing the sipe total length (actual length along the shape of the sipe) by a grounding area of the shoulder land part obtained when the tire is grounded with a load corresponding to 75% of the load index.

Shown as "Installation Inner Side" in the shoulder land part in Table 1 is "Inner Shoulder Land Part 30", shown as "Installation Outer Side" is "Outer Shoulder Land Part 28", and the same goes for other items.

In an evaluation method of steerability, each example was mounted to a front wheel drive vehicle having a displacement of 2,000 cc, the vehicle was run on a steerability evaluation road of a test course with only one person getting in the car, and the operation stability was indexed from sensory evaluation (feeling evaluation) by the test driver. Run on a steerability evaluation road includes run on normal road surface and run on snow road surface. In indexing of operation stability, the evaluation index of a standard conventional pneumatic tire was expressed as 100, and a relative

TABLE 1

|  |  |  |  | UNIT | Ex. 1 | Ex. 2 | Ex. 3 | Ex. 4 | Ex. 5 | Con. Ex. 1 | Con. Ex. 2 | Con. Ex. 3 |
|---|---|---|---|---|---|---|---|---|---|---|---|---|
| Performance |  | Operation Stability on Normal Road |  | — | 120 | 110 | 108 | 113 | 115 | 95 | 101 | 103 |
|  |  | Operation Stability on Snow Road |  | — | 120 | 120 | 120 | 105 | 120 | 100 | 96 | 100 |
|  |  | Drainage Performance |  | — | 120 | 120 | 120 | 120 | 120 | 100 | 102 | 100 |
|  |  | Abrasion Resistance |  | — | 120 | 120 | 120 | 120 | 110 | 100 | 99 | 100 |
| Structure | Intermediate Land Part | Installation Inner Side | Width | mm | 21 | 21 | 21 | 21 | 21 | 24 | 21 | 21 |
|  |  | Installation Outer Side | Width | mm | 24 | 24 | 24 | 24 | 24 | 21 | 24 | 24 |
|  | Lug Groove in Intermediate Land Part |  |  | — | Alternate | Alternate | Alternate | Alternate | Alternate | Alternate | Only Both Ends Communication | Alternate |
|  | Shoulder Land Part | Installation Inner Side | Width | mm | 33 | 33 | 33 | 33 | 33 | 38 | 33 | 33 |
|  |  | Installation Outer Side | Width | mm | 38 | 38 | 38 | 38 | 38 | 33 | 38 | 38 |
|  | Lug Groove in Center Land Part | Installation Inner Side | Groove Width | mm | 3.5 | 3.5 | 3.5 | 3.5 | 3.5 | 3.5 | 3.5 | 2 |
|  |  | Installation Outer Side | Groove Width | mm | 2 | 2 | 2 | 2 | 2 | 2 | 2 | 3.5 |
|  | Circumferential Narrow Groove in Shoulder Land Part | Installation Inner Side | Groove Width | mm | 2 | 0.7 | 2 | 2 | 2 | 2 | 2 | 2 |
|  |  | Installation Outer Side | Groove Width | mm | 0.7 | 2 | 0.7 | 0.7 | 0.7 | 0.7 | 0.7 | 0.7 |
|  | Sipe Density in Shoulder Land Part | Installation Inner Side | Density | $mm^{-1}$ | 0.067 | 0.067 | 0.055 | 0.067 | 0.067 | 0.051 | 0.067 | 0.067 |
|  |  | Installation Outer Side | Density | $mm^{-1}$ | 0.051 | 0.051 | 0.055 | 0.051 | 0.051 | 0.067 | 0.051 | 0.051 |
|  | Presence or Absence of Groove Width Sudden Change Part in Lug Groove of Center Land Part |  |  |  | Present | Present | Present | Absent | Present | Present | Present | Present |
|  | Presence or Absence of Connection Between First Sipe and Second Sipe of Inner Intermediate Land Part |  |  |  | Absent | Absent | Absent | Absent | Present | Present | Present | Present |

Shown in Table 1 as the width of the shoulder land part is a width obtained when the tire is grounded with a load corresponding to 75% of the load index. Moreover, the expression "Alternate" in the column "Lug Groove in Intermediate Land Part" means that lug grooves, which have both ends communicating with main grooves, and lug grooves, which have only one end communicating with a main groove, are arranged alternately in the tire circumferential direction, and expression "Only Both Ends Communication" means that only lug grooves, which have both ends comindex was found as an evaluation index for each tire. An evaluation index having a larger value indicates that the operation stability is more preferable.

As seen from Table 1, the operation stability of Examples 1 to 5 showed more preferable evaluation results than that of a standard conventional pneumatic tire on both of normal road and snow-covered road.

In an evaluation method of drainage efficiency, each example was mounted to a front wheel drive vehicle having a displacement of 2,000 cc, and a braking distance from speed per hour 80 km/h to stop on road surface having a water depth of 4 mm was measured. The evaluation index of the braking distance of a standard conventional pneumatic tire was expressed as 100, and a relative index was found as an evaluation index for each tire. An evaluation index having a larger value indicates that the braking distance is shorter, that is, the drainage efficiency is more preferable.

As seen from Table the drainage efficiency of Examples 1 to 5 showed more preferable evaluation results than that of a standard conventional pneumatic tire.

In an evaluation method of abrasion resistance, each example was mounted to a front wheel drive vehicle having a displacement of 2,000 cc, and the abrasion loss of a tread part was measured after the front wheel drive vehicle was run for 10,000 km. In this measurement, the mean value of a change in groove depth at 10 points was measured. The evaluation index of abrasion loss of a standard conventional pneumatic tire was expressed as 100, and a relative index was found as an evaluation index for each tire. An evaluation index having a larger value indicates that the abrasion resistance is better.

As seen from Table 1, the abrasion resistance of Examples 1 to 5 showed more preferable evaluation results than that of a standard conventional pneumatic tire.

It should be noted that the present application claims priority to Japanese Patent Application No. 2015-016379, filed on Jan. 30, 2015, the entire contents of which are incorporated by reference herein.

INDUSTRIAL APPLICABILITY

The aspect of the present invention provides a pneumatic tire which can improve operation stability in cornering while maintaining drainage performance.

REFERENCE SIGNS LIST

10 PNEUMATIC TIRE
12 TREAD PART
14 MAIN GROOVE
16 MAIN GROOVE
18 MAIN GROOVE
20 MAIN GROOVE
22 CENTER LAND PART
24 OUTER INTERMEDIATE LAND PART
26 INNER INTERMEDIATE LAND PART
28 OUTER SHOULDER LAND PART
28*a* AREA
30 INNER SHOULDER LAND PART
30*a* AREA
32 CENTER LUG GROOVE
32*c* GROOVE WIDTH SUDDEN CHANGE PART
36 CENTER SIPE
42*e* OUTER INTERMEDIATE FIRST LUG GROOVE
42*ew* BEND PART
42*i* INNER INTERMEDIATE FIRST LUG GROOVE
44*e* OUTER INTERMEDIATE SECOND LUG GROOVE
44*i* INNER INTERMEDIATE SECOND LUG GROOVE
46 OUTER INTERMEDIATE SIPE
47 INNER INTERMEDIATE SIPE
48 FIRST SIPE
49 SECOND SIPE
54 OUTER CIRCUMFERENTIAL SIPE
64 INNER CIRCUMFERENTIAL NARROW GROOVE
72 CENTER SHALLOW GROOVE PART
72*e*, 72*i* CENTER SHALLOW GROOVE BOTTOM-RAISED PART
83*e*, 84*e* OUTER INTERMEDIATE SHALLOW GROOVE PART
82*ee*, 82*ei*, 84*ee*, 84*ei* OUTER INTERMEDIATE SHALLOW GROOVE BOTTOM-RAISED PART
82*i*, 84*i* INNER INTERMEDIATE SHALLOW GROOVE PART
82*ie*, 82*ii*, 84*ie*, 84*ii* INNER INTERMEDIATE SHALLOW GROOVE BOTTOM-RAISED PART

The invention claimed is:

1. A pneumatic tire having a tread part partitioned by four main grooves extending in a tire circumferential direction, the tire comprising:
a center land part;
an outer intermediate land part adjoining an installation outer side of the center land part;
an inner intermediate land part adjoining an installation inner side of the center land part;
an outer shoulder land part adjoining an installation outer side of the outer intermediate land part; and
an inner shoulder land part adjoining an installation inner side of the inner intermediate land part, wherein
a center lug groove having a smaller width on an installation outer side than on an installation inner side is formed in the center land part,
the outer intermediate land part has a width larger than a width of the inner intermediate land part,
the outer shoulder land part has a width larger than a width of the inner shoulder land part,
the outer intermediate land part has
an outer intermediate first lug groove having both ends in a tire transversal direction communicating with main grooves, and
an outer intermediate second lug groove having one end on a tire transversal outer side communicating with a main groove and the other end on a tire transversal inner side terminating in the outer intermediate land part,
the outer intermediate first lug groove and the outer intermediate second lug groove are arranged alternately in a tire circumferential direction,
the inner intermediate land part has
an inner intermediate first lug groove having both ends in a tire transversal direction communicating with main grooves, and
an inner intermediate second lug groove having one end on a tire transversal inner side communicating with a main groove and the other end on a tire transversal outer side terminating in the inner intermediate land part, and
the inner intermediate first lug groove and the inner intermediate second lug groove are arranged alternately in a tire circumferential direction,.
wherein an outer circumferential sipe extending in a tire circumferential direction is formed in the outer shoulder land part, and
an inner circumferential narrow groove extending in a tire circumferential direction and having a width larger than a width of the outer circumferential sipe is formed in the inner shoulder land part,
wherein the outer shoulder land part is partitioned by the outer circumferential sipe.

2. The pneumatic tire according to claim 1, wherein the outer intermediate first lug groove formed in the outer intermediate land part has a bent part.

3. The pneumatic tire according to claim 1, wherein
an outer intermediate sipe formed in the outer intermediate land part has both ends terminating in the outer intermediate land part, and
a center sipe formed in the center land part has one end part communicating with the center lug groove and the other end part terminating in the center land part.

4. The pneumatic tire according to claim 1, wherein sipe density of an area on a tire center side of the outer shoulder land part partitioned by the outer circumferential sipe is lower than sipe density of an area on a tire center side of the inner shoulder land part partitioned by the inner circumferential narrow groove.

5. The pneumatic tire according to claim 1, wherein
a groove width sudden change part is formed in the center lug groove, and
the center lug groove has a smaller width on an installation outer side than on an installation inner side.

6. The pneumatic tire according to claim 3, wherein an inner intermediate sipe formed in the inner intermediate land part includes
a first sipe extending in a tire circumferential direction so as to couple the inner intermediate first lug groove and the inner intermediate second lug groove, and
a second sipe inclined in a direction opposite to the first sipe with respect to tire equatorial line in an area between the inner intermediate first lug groove and the inner intermediate second lug groove and not connected with the first sipe.

7. A pneumatic tire having a tread part partitioned by four main grooves extending in a tire circumferential direction, the tire comprising:
a center land part;
an outer intermediate land part adjoining an installation outer side of the center land part;
an inner intermediate land part adjoining an installation inner side of the center land part;
an outer shoulder land part adjoining an installation outer side of the outer intermediate land part; and
an inner shoulder land part adjoining an installation inner side of the inner intermediate land part, wherein
a center lug groove having both ends respectively communicating with main grooves and having a smaller width on an installation outer side than on an installation inner side is formed in the center land part,
the outer intermediate land part has a width larger than a width of the inner intermediate land part,
the outer shoulder land part has a width larger than a width of the inner shoulder land part,
a center sipe is formed in the center land part,
an outer intermediate sipe is formed in the outer intermediate land part,
an inner intermediate sipe is formed in the inner intermediate land part, and
a sipe angle of the outer intermediate sipe is larger than a sipe angle of the center sipe and the inner intermediate sipe,
wherein an outer circumferential sipe extending in a tire circumferential direction is formed in the outer shoulder land part, and
an inner circumferential narrow groove extending in a tire circumferential direction and having a width larger than a width of the outer circumferential sipe is formed in the inner shoulder land part,
wherein the outer shoulder land part is partitioned by the outer circumferential sipe.

8. The pneumatic tire according to claim 7, wherein
the outer intermediate land part has an outer intermediate lug groove at least one end on a tire transversal outer side communicating with a main groove,
the outer intermediate lug groove includes an outer intermediate first lug groove having both tire transversal end parts communicating with main grooves, and
a bend part is formed in the outer intermediate first lug groove.

9. The pneumatic tire according to claim 7, wherein
a center shallow groove part having a groove depth smaller than a groove depth of the main grooves is formed in the center lug groove, and
the center shallow groove part is provided with a plurality of center shallow groove bottom-raised parts arranged at both tire transversal end parts apart from each other in a tire transversal direction and obtained by raising a bottom of the center shallow groove part.

10. The pneumatic tire according to claim 9, wherein
the center shallow groove bottom-raised parts are formed at an opening part opened to a main groove on a tread transversal inner side, and are formed at an outer center lug groove opened to a main groove on a tread transversal outer side and having a small groove width, and
a groove depth of the center shallow groove part becomes the smallest at a center shallow groove bottom-raised part formed at the opening part and becomes the largest at a position sandwiched between the opening part and the outer center lug groove in the center shallow groove part.

11. The pneumatic tire according to claim 7, wherein
the outer intermediate land part has an outer intermediate lug groove at least one end on a tire transversal outer side communicating with a main groove,
an outer intermediate shallow groove part having a groove depth smaller than a groove depth of the main grooves is formed in the outer intermediate lug groove,
the outer intermediate shallow groove part is provided with a plurality of outer intermediate shallow groove bottom-raised parts positioned apart from each other in a tire transversal direction and obtained by raising a bottom of the outer intermediate shallow groove part, and
both end parts of the outer intermediate shallow groove part are arranged apart from an opening position where the outer intermediate lug groove communicates with a main groove.

12. The pneumatic tire according to claim 7, wherein
the inner intermediate land part has an inner intermediate lug groove at least one end on a tire transversal inner side communicating with a main groove,
an inner intermediate shallow groove part having a groove depth smaller than a groove depth of the main grooves is formed in the inner intermediate lug groove,
the inner intermediate shallow groove part is provided with a plurality of inner intermediate shallow groove bottom-raised parts positioned apart from each other in a tire transversal direction and obtained by raising a bottom of the inner intermediate shallow groove part, and
both end parts of the inner intermediate shallow groove part are arranged apart from an opening position where the inner intermediate lug groove communicates with a main groove.

13. The pneumatic tire according to claim 7, wherein the main grooves include a widest main groove having a largest width in a tread transversal direction and positioned closest to tire equatorial line.

14. The pneumatic tire according to claim 7, wherein the main grooves include a narrowest main groove having a smallest width in a tread transversal direction and being a main groove defining the outer shoulder land part.

15. The pneumatic tire according to claim 10, wherein
the outer intermediate sipe formed in the outer intermediate land part is a sipe having both ends terminating in the outer intermediate land part, and
the outer intermediate sipe has a tread transversal outer end part laid on a tread transversal position of an outer intermediate shallow groove bottom-raised part.

16. The pneumatic tire according to claim 7, wherein
the inner intermediate land part has an inner intermediate lug groove at least one end on a tire transversal inner side communicating with a main groove,
the inner intermediate sipe is positioned in an area between inner intermediate lug grooves adjoining each other in a tire circumferential direction, and
the inner intermediate sipe has a first sipe inclined in a direction opposite to the inner intermediate lug groove in a tire circumferential direction, and has a second sipe arranged apart from the first sipe.

17. The pneumatic tire according to claim 16, wherein both ends of the first sipe are formed to communicate with the inner intermediate lug groove, and
at least one end part of the first sipe communicates with an inner intermediate shallow groove bottom-raised part.

18. The pneumatic tire according to claim 7, wherein
the center sipe is inclined in a direction opposite to the center lug groove in a tire circumferential direction and intersects center line of the center land part extending through a tread transversal middle,
the outer intermediate land part has
an outer intermediate first lug groove having both ends in a tire transversal direction communicating with main grooves, and
an outer intermediate second lug groove having one end on a tire transversal outer side communicating with a main groove and the other end on a tire transversal inner side terminating in the outer intermediate land part,
the outer intermediate first lug groove and the outer intermediate second lug groove are arranged alternately in a tire circumferential direction,
the inner intermediate land part has
an inner intermediate first lug groove having both ends in a tire transversal direction communicating with main grooves, and
an inner intermediate second lug groove having one end on a tire transversal inner side communicating with a main groove and the other end on a tire transversal outer side terminating in the inner intermediate land part, and
the inner intermediate first lug groove and the inner intermediate second lug groove are arranged alternately in a tire circumferential direction.

* * * * *